March 6, 1962    A. ABOLINS    3,024,042
RETRACTABLE LANDING GEAR
Filed March 20, 1961    6 Sheets-Sheet 1
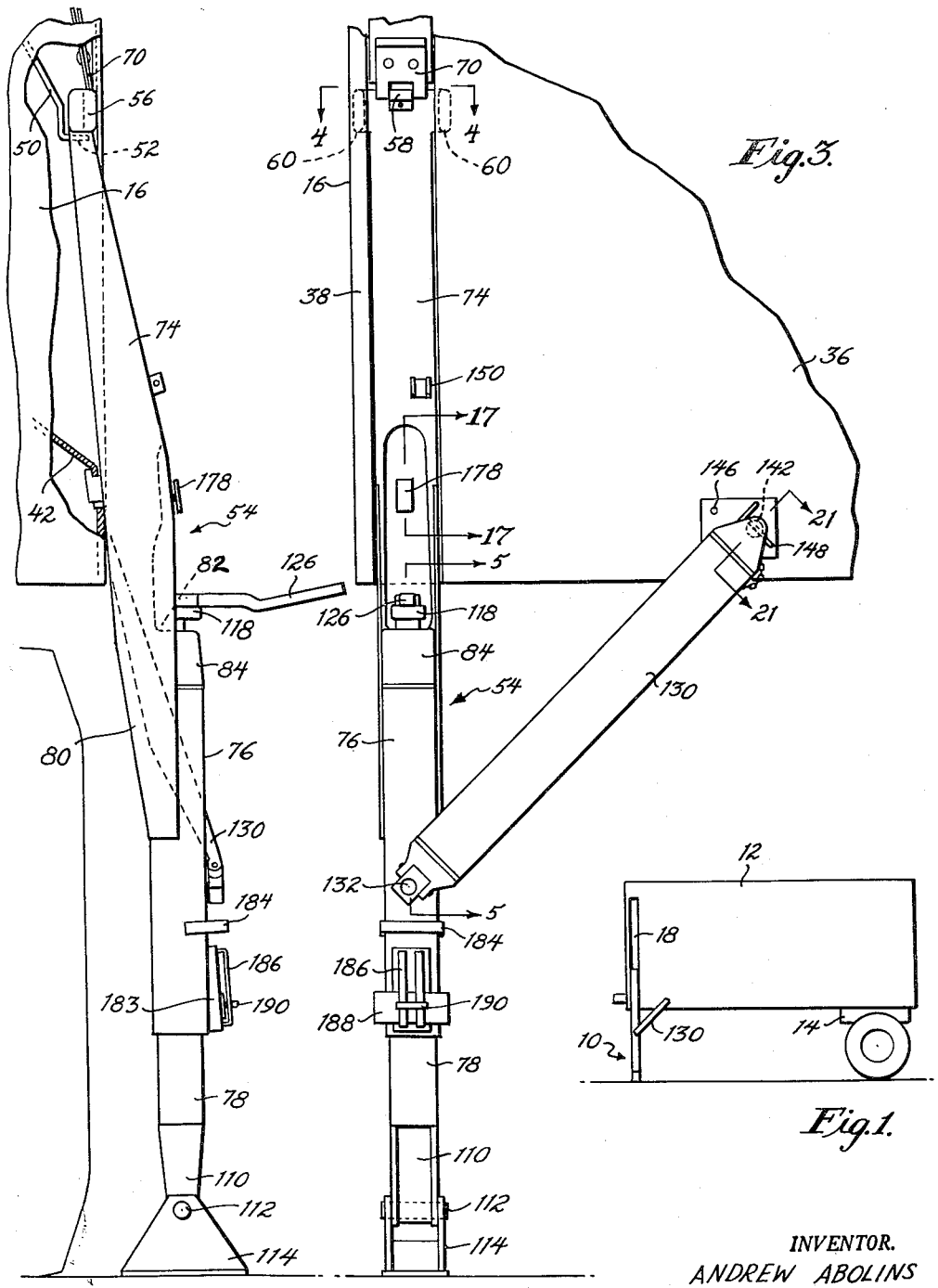
INVENTOR.
ANDREW ABOLINS
BY Max R. Millman
ATTORNEY March 6, 1962 A. ABOLINS 3,024,042
RETRACTABLE LANDING GEAR
Filed March 20, 1961 6 Sheets-Sheet 2
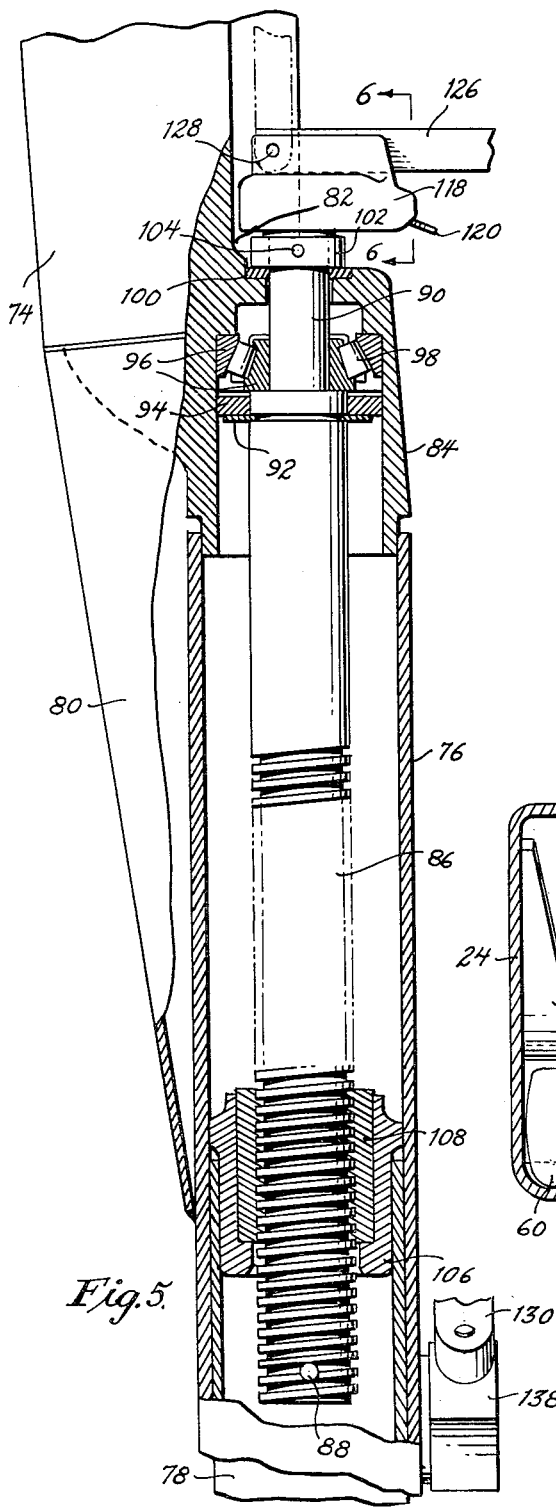
Fig. 5.
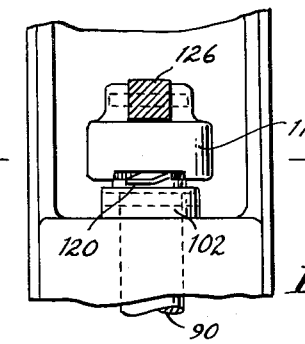
Fig. 6.
Fig. 7.
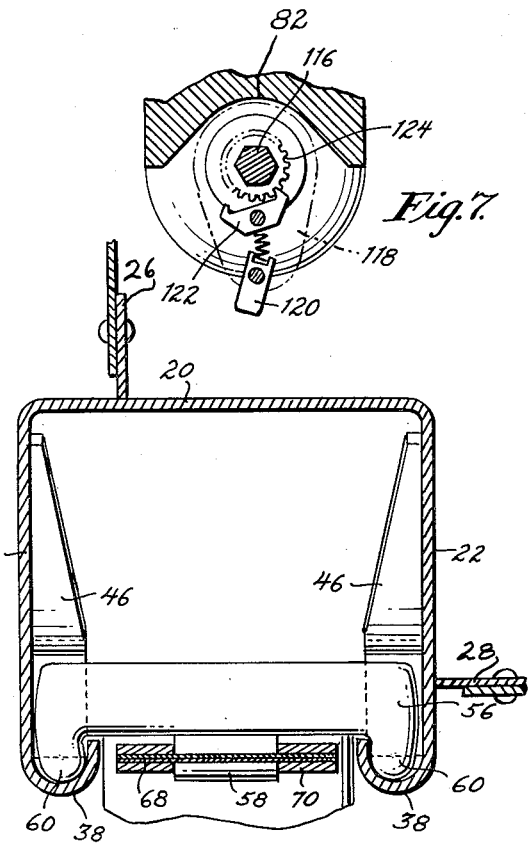
Fig. 4.
INVENTOR.
ANDREW ABOLINS
BY Max R. Millman
ATTORNEY.

March 6, 1962
A. ABOLINS
3,024,042
RETRACTABLE LANDING GEAR
Filed March 20, 1961
6 Sheets-Sheet 3
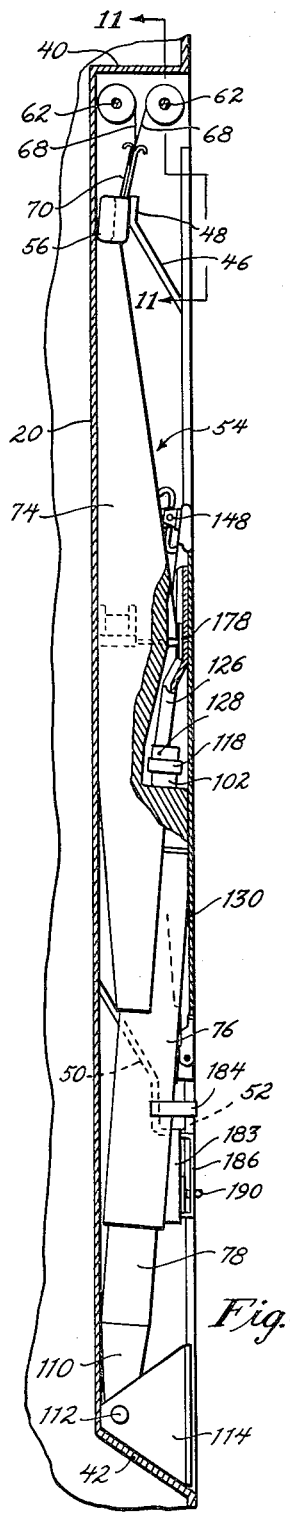
Fig.8.
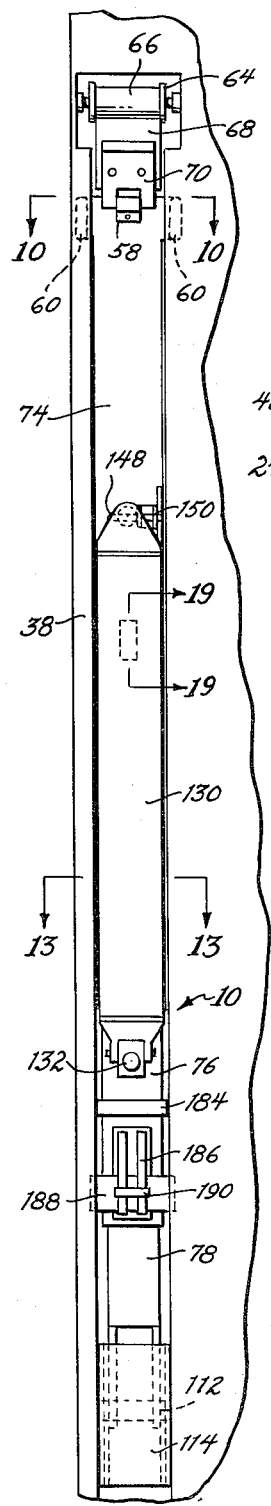
Fig.9.
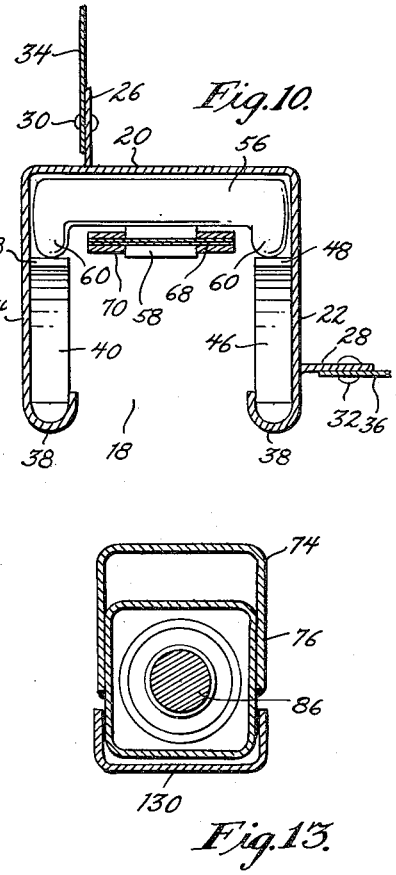
Fig.10.
Fig.13.
INVENTOR.
ANDREW ABOLINS
BY Max R. Millman
ATTORNEY.

March 6, 1962

A. ABOLINS 3,024,042

RETRACTABLE LANDING GEAR

Filed March 20, 1961

INVENTOR.
ANDREW ABOLINS
BY
Max R. Millman
ATTORNEY.

March 6, 1962 A. ABOLINS 3,024,042
RETRACTABLE LANDING GEAR
Filed March 20, 1961 6 Sheets-Sheet 5

INVENTOR.
ANDREW ABOLINS
BY
Max R. Millman
ATTORNEY

March 6, 1962   A. ABOLINS   3,024,042
RETRACTABLE LANDING GEAR
Filed March 20, 1961   6 Sheets-Sheet 6
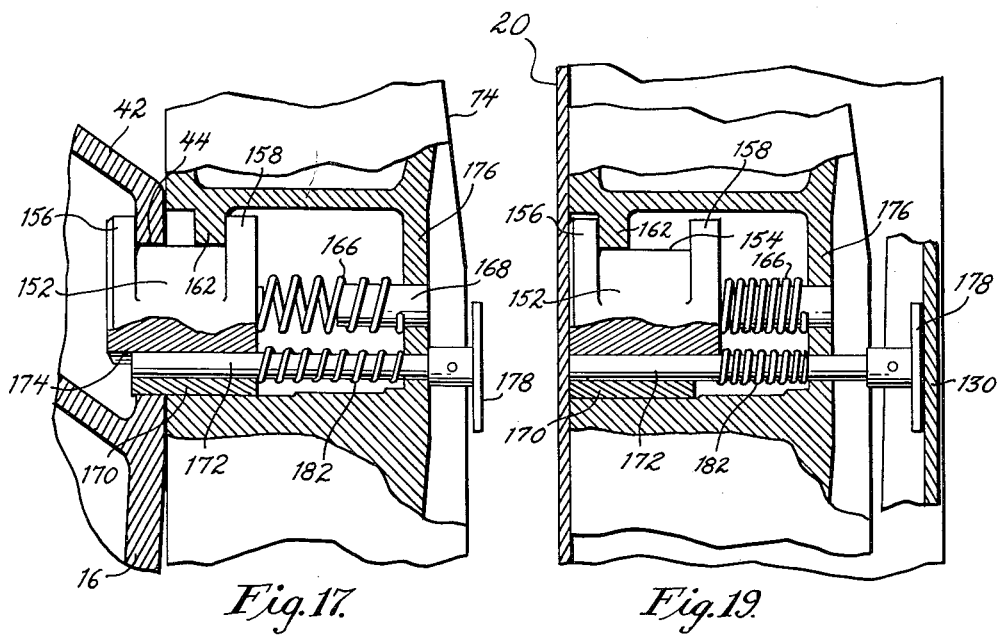
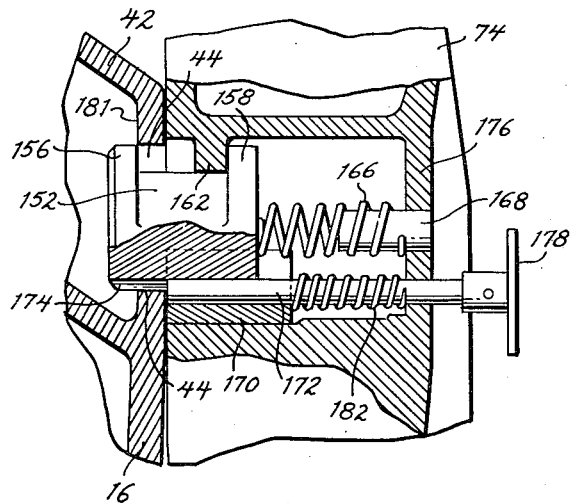
INVENTOR.
ANDREW ABOLINS
BY Max R. Millman
ATTORNEY.

3,024,042
RETRACTABLE LANDING GEAR
Andrew Abolins, Penndel, Pa., assignor to Strick Trailers, a Division of Fruehauf Trailer Co., Philadelphia, Pa., a corporation of Michigan
Filed Mar. 20, 1961, Ser. No. 96,969
13 Claims. (Cl. 280—150.5)

This invention relates to landing gears for use with vehicles, such as semi-trailers, the primary object of which is to provide a construction whereby the loading gears are readily and fully retractable into vertically extending corner members in the vehicle and there stored when inoperative, the same constituting a continuation-in-part of my copending application Serial No. 34,241, filed June 6, 1960 now Patent No. 2,990,194.

In modern transportation systems it is desirable at times to couple semi-trailers horizontally and transport the coupled bodies as a unit by means of a single prime mover. The coupling of the bodies must be effected while they are in substantial horizontal alignment otherwise the bodies or units receiving the couplers will be damaged. It is therefore another object of the invention to provide landing gears of the character described which are readily adjustable in height to permit effective horizontal alignment of the bodies prior to or during coupling.

Another object of the invention is to provide a retractable landing gear of the character described in which the vertical adjustment of the leg can be readily effected at the level of the operator above his waist and at an accessible location.

Another important object of the invention is to provide a landing gear as described which is attached at its upper end to the vertical corner member by a resilient counter-balancing means urging the landing gear to its retracted or storage position in the corner member upon release of the landing gear.

Another object of the invention is to provide a vertically adjustable and retractable landing gear equipped with a secure but easily operable means for securing an intermediate portion of the landing gear on the vehicle or container when in its operative or load supporting position.

Another object of the invention is to provide a retractable landing gear of the character described including a vertically adjustable leg, a brace and a foot so interconnected as to be storable as a unit into the vertical corner member of the vehicle or container, there being an easily operable means to releasably attach the free end of the brace to a portion of the vehicle or container when the leg is in its operative or supporting position and a means releasably retaining the brace against the leg in its inoperative or storage position.

These and other objects of the invention will become more apparent as the following description proceeds in conjunction with the accompanying drawings, wherein:

FIGURE 1 is a diagrammatic side elevational view of a vehicle embodying the present landing gear and illustrating the same in its supporting position;

FIGURE 2 is a fragmentary front elevational view of a vehicle body showing the landing gear in its operative or supporting position;

FIGURE 3 is a side elevational view showing the landing gear in its operative or supporting position;

FIGURE 4 is an enlarged sectional view taken on the line 4—4 of FIGURE 3;

FIGURE 5 is an enlarged sectional view taken on the line 5—5 of FIGURE 3;

FIGURE 6 is a sectional view taken on the line 6—6 of FIGURE 5;

FIGURE 7 is a sectional view taken on the line 7—7 of FIGURE 6;

FIGURE 8 is an enlarged front view of the landing gear in its stored position, the corner member being shown in vertical section and other parts being broken away to show details of construction;

FIGURE 9 is an enlarged side view of the landing gear in its stored position;

FIGURE 10 is a sectional view taken on the line 10—10 of FIGURE 9;

FIGURE 13 is a sectional view taken on the line 13—13 of FIGURE 9;

FIGURE 17 is an enlarged sectional view taken on the line 17—17 of FIGURE 3 illustrating the means releasably securing an intermediate portion of the landing gear leg to the vehicle, the means being shown in its locked position;

FIGURE 18 is a view similar to FIGURE 17 showing the releasable securing means in an engaged position but not locked;

FIGURE 19 is a sectional view taken on the line 19—19 of FIGURE 9 and illustrating the releasable securing means as retracted for storage;

Specific reference is now made to the drawings wherein similar reference characters are used for corresponding elements throughout.

Figures 11, 12:
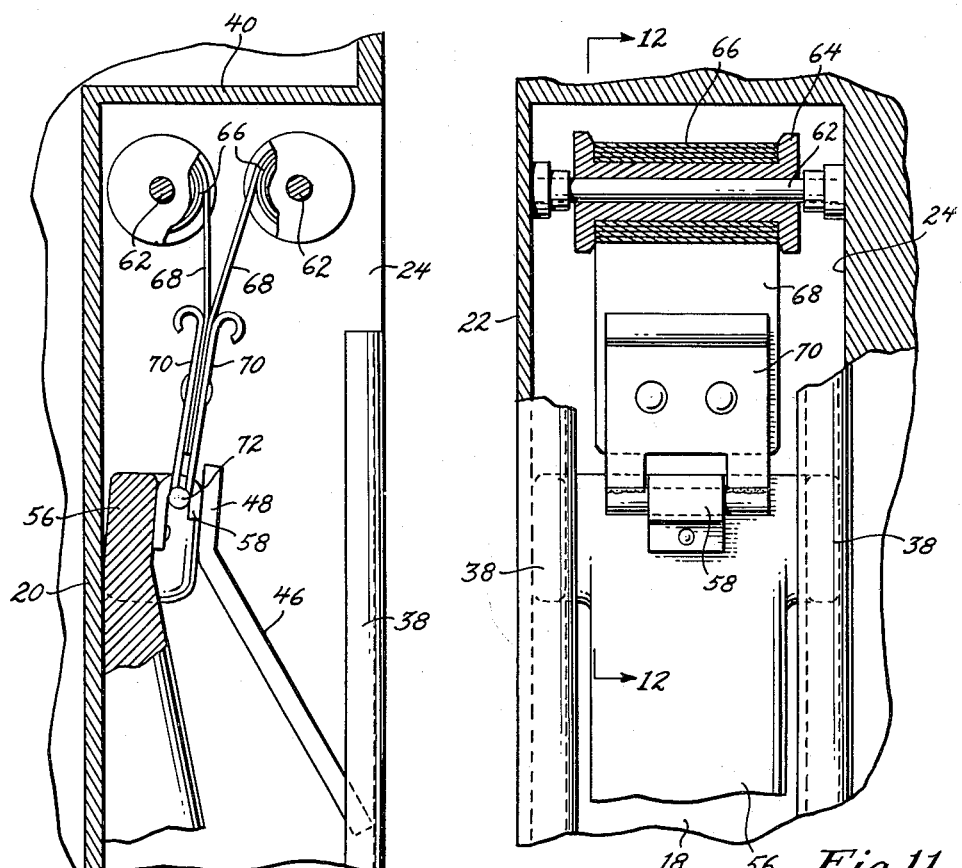
FIGURE 11 is an enlarged sectional view taken on the line 11—11 of FIGURE 8.
FIGURE 12 is a sectional view taken on the line 12—12 of FIGURE 11.
Figure 20:
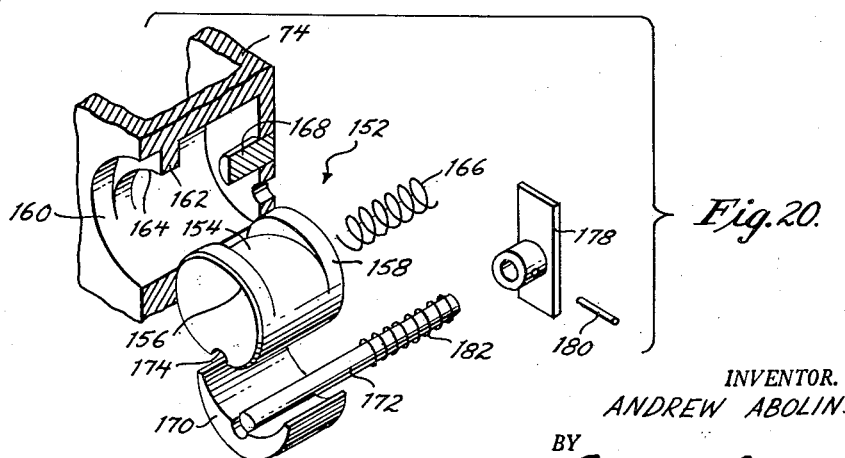
FIGURE 20 is an exploded perspective view of the releasable securing means.

The retractable landing gear 10 of the instant invention is generally applicable to any device requiring load support for a given time but is especially adapted for use with a container in the form of a semi-trailer 12 adapted to be coupled horizontally by suitable means to another semi-trailer. In practice the front semi-trailer (not shown) which is attached to a fifth wheel or prime mover is backed up towards the front of the rear semi-trailer 12 while the latter is supported on its running gear 14 and on the landing gears 10 and until the couplers engage in suitable socket members in the rear of the front trailer. Since substantial force is required to effect the coupling, the trailer bodies and more particularly the couplers and the socket members into which they enter must be horizontally aligned otherwise serious damage may result to the socket members and the trailer bodies. For this reason, the landing gears are equipped with vertical adjustment means as will appear hereinafter. After coupling is effected and the bodies are horizontally connected, the landing gears are retracted and stored in corner members in the body, as will appear hereinafter, where they are readily accessible for re-use when the bodies are to be uncoupled.

Coming first to the corner members 16, it will be seen that there are two of them which extend vertically of the front corners of the vehicle body or container approximately the full height thereof. The corner member is substantially U-shaped in cross section as seen in FIGURES 4 and 10, the outer side wall thereof being open as at 18. The inner wall 20 and one of the end walls 22 and 24 of the corner member include flanges 26 and 28 respectively to which are secured as at 30 and 32 the front and side panels 34 and 36 of the body. The end walls 22 and 24 at the side opening 18 include inwardly curved substantially C-shaped flanges 38. The upper end of the corner member 16 is closed as at 40 and adjacent its lower end the corner member is provided with an upwardly and inwardly inclined wall 42, see FIGURES 2, 8, 17–19. Below the inclined wall 42, the corner member is a hollow box-like structure having a side wall below the side opening 18 which is provided with an aperture 44 for a purpose soon to appear.

Adjacent its upper end the corner member end walls 22 and 24 are provided with opposed upwardly and inwardly inclined inner guide flanges 46 which terminate in substantially flat finger portions 48. Above the inclined wall 42 of the corner member and approximately one-third the way up, end walls 22 and 24 of said corner member are again provided with upwardly and inwardly inclined inner guide flanges 50 which terminate in a horizontally extending ledge portion 52.

The landing gear leg is generally shown at 54 and will be described in detail later. Its upper end is in the form of a tapered solid member 56 to which is secured a curved clip 58 and whose ends 60 extend substantially perpendicularly therefrom and towards the curved flanges 38 of the end walls 22 and 24 of the corner member. Mounted on the end walls 22 and 24 below the upper closure 40 and extending across the corner member are shafts 62 which rotatably mount spools 64 upon which are wound counter-balancing springs 66, the leaves 68 of which are joined and secured to a clevis member 70 carrying a short pin 72 which straddles the clevis and engages the hook portion of the clip 58 at the top of the leg. The preferred counter-balancing means or springs 66 are constant retraction force torsion springs such as the "Negator" springs manufactured and sold by the Hunter Spring Co. of Lansdale, Pennsylvania.

As seen more clearly in FIGURES 2, 3, 8 and 9, the leg 54 essentially comprises three sections, an upper section 74, an intermediate section 76 fixed thereto and a lower section 78 which is telescoped into the intermediate section. The upper section 74 is substantially hollow except for certain solid portions as will appear hereinafter, said solid member 56 to which the counter-balancing means is attached being secured to the upper end of said upper section 74. The upper section is adapted to be releasably attached to the corner member through the aperture 44 provided therein and, for strength reasons, the section tapers towards its ends from the attachment locus. The lower end portion of the upper section 74 is provided with gussets 80 which are welded or otherwise secured along the length of the intermediate section 76, the latter being substantially rectangular in horizontal cross section. Immediately above the gussets, the upper section is solid and inwardly dished as at 82, see FIGURES 2 and 5, and includes a hollow cap member 84 which is secured upon the upper end of said intermediate member 76.

Extending vertically through the intermediate member is a jack screw 86 which has a cross pin 88 at its lower end and a reduced portion 90 at its upper end. Held on the jack screw 86 by means of a retaining ring 92 is a grease seal 94. A bearing is provided which rotatably journals the upper reduced end of the screw, the bearing consisting of inner and outer races 96 with rollers 98 therebetween, the inner race 96 bearing against the shoulder formed where the screw is reduced, as seen in FIGURE 5. The reduced portion 90 of the screw extends through a dust seal 100 into the dished out portion 82 of the upper leg section and is retained on the cap 84 by means of a collar 102 and a pin 104 therethrough. Thus the screw is free to rotate in the section 76.

The lower section 78 is also rectangular in horizontal cross-section and fits telescopingly into the lower end of the intermediate section 76. Fixed to the inner surface of the upper end of the lower section 78 is a cap 106 which mounts an internally threaded nut 108 that receives the jack screw 86. The lower end of the lower section 78 is a solid member 110 to which is pivoted as at 112 a conventional channel shaped ground-engaging foot pad 114.

Thus turning the screw will raise and lower the foot pad and thereby effect a vertical adjustment of the landing gear leg. To effect the turning a reversible ratchet type wrench is affixed to that portion 116 of the reduced portion 90 of the screw which extends beyond the retaining collar 102. The wrench, as seen more clearly in FIGURES 5–7, consists of a housing 118 which through a ratchet mechanism engages the hex-portion 116 and extends into the dished out area 82 of the upper leg section 74. The housing includes a slot through which a short finger 120 extends, the same being operatively connected to a centrally pivoted pawl 122 engageable with a ratchet 124 provided in the housing. A wrench handle 126 is pivoted as at 128 for movement vertically towards or away from the leg. In the down position, the handle extends into a groove in the wrench housing whereby, after setting the pawl 122 by the finger 120, short strokes of the handle will either raise or lower the foot pad, the location of the handle being above waist level for ease of operation.

To properly support the vehicle, the landing gear is provided with a brace and a releasable means attaching the upper section 74 to the corner member through the aperture 44 provided in said member.

Figure 14:
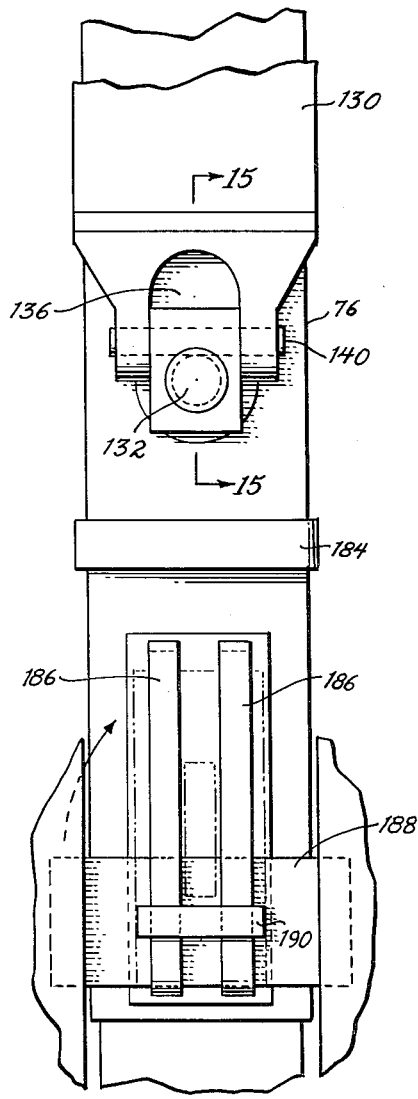
FIGURE 14 is an enlarged fragmentary side elevational view of the landing gear illustrating details of construction.
Figure 15:
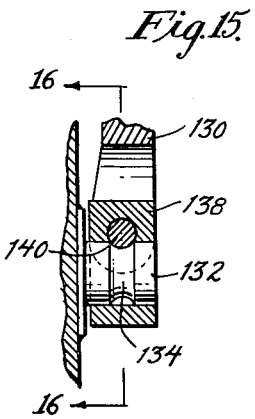
FIGURE 15 is a sectional view taken on the line 15—15 of FIGURE 14.
Figure 16:
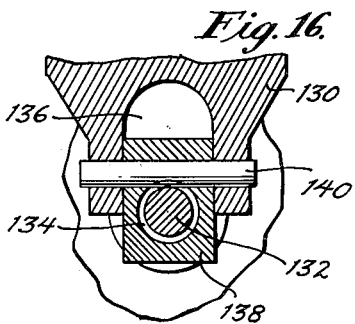
FIGURE 16 is a sectional view taken on the line 16—16 of FIGURE 15.
Figure 21:
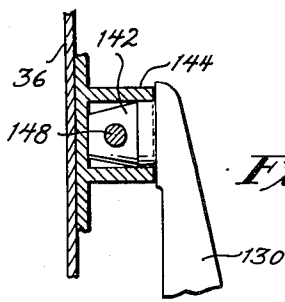
FIGURE 21 is a sectional view taken on the line 21—21 of FIGURE 3.

Regarding the brace, the same consists of a member 130 of channel cross-section, one end of which is universally pivoted to said intermediate leg section 76. This is accomplished as seen in FIGURES 14–16, by securing as by welding to the section 76 a button or trunnion 132 having a circumferential groove 134. The end of the brace is bifurcated as at 136 between which furcations a bearing block 138 is secured by a pin 140 that extends into the circumferential groove 134. Thus this end of the brace is rotatable around the axis of the trunnion which is substantially perpendicular to the plane of the section 76 and also rotatable in an arc towards and away from the leg section.

The other or outer end of the brace 130 is provided with a trunnion 142 which is adapted to be received in a socket member 144 that is secured by means of a suitable plate to the side skin 36 as at 146, the trunnion being removably retained in the socket member by means of a cross pin 148 carried by the brace, which pin may be made to extend diametrically through the trunnion and socket member in the operative or support position of the brace. In the storage position the brace 130 lies against and straddles the leg, the upper section 74 of which is provided with a bracket 150 adapted to removably receive the pin 148 carried by the brace.

Coming now to the means releasably attaching the upper section 74 to the corner member, attention is directed to FIGURES 17–20. A locking or latching pin 152 is provided which is formed of two cylindrical members whose centers are offset approximately ½ inch and undercutting a crescent portion 154 thereby providing two opposed crescent shaped end flanges 156 and 158. At its bellied portion the upper section 74 is provided with a transverse cylindrical bore 160 which consists of bores of the same diameters as those of the pin 152 also with the centers offset ½ inch. At its inner surface the bore wall is provided with a flange 162 having an arcuate lower surface 164 which is the circumferential continuation of the lower of the two bore circles.

The overall diameter of the pin 152 is slightly less than that of bore 160 and when disposed therein is urged towards the end of the bore 160 confronting the corner member 42 by a coil spring 166 which is held by a pintle 168 in the section 74 and bears on the pin 152. A crescent shaped member 170 is provided which is complementary to the cut-out portion 154 of the locking pin. Secured along the length of said member is a rod 172 which fits slidably in a groove 174 at the bottom of the locking pin 152, the rod extending slidably through an aperture in the outer wall 176 of the upper leg section 74, there being a head or button 178 which is secured by pin 180 to the exposed end of the rod. A coil spring 182 is wound about the rod and bears terminally on the wall 176 and crescent member 170 urging the latter towards the end of the bore 160 confronting the corner member.

When the leg is moved towards the corner member, the crescent member 170 and rod 172 strike the wall 181 and are urged against action of spring 182 away from the corner member so that the locking pin can now pass through the aperture 44 in the corner member, as shown in FIGURE 18. Then raising the leg upwardly until the arcuate surface 164 of flange 162 contacts the cut-out portion 154 of the locking pin will permit the spring 182 to urge the crescent member 170 to move into the aperture 44 and fill the void thereby completing the locking action, as shown in FIGURE 17. To uncouple the leg from the corner member, the crescent member 170 is manually retracted via the head 178 and then the leg is lowered until the locking pin can pass through the corner member aperture 44 upon withdrawal of the leg. In the stored position, see FIGURES 8 and 19, the inner wall 20 of the corner member 16 bears against the outer flange 156 of the pin 152 and against the cresent member 170, pushing them both against pressure of springs 166 and 182 flush into the section 74.

The intermediate section 76 of the leg has secured thereto by a mounting plate 183 a means to releasably hold the leg in its fully retracted position in the corner member. Also secured to the section 76 is a bail or substantially U-shaped handle 184 by which to move the leg. The means to releasably hold the leg in its retracted position includes spaced substantially U-shaped vertical straps 186 and a plate 188 which, in its position transverse that of the leg is longer than the width of the leg, the plate 188 including a handle portion 190 which is secured centrally to the plate and is disposed exteriorly of the straps 186. When the plate 188 is raised sufficiently it can be rotated to a vertical non-latching position as shown in phantom lines in FIGURE 14.

In use, by means of handle 184 the operator pulls the landing gear down from its position of storage in the corner member 16. In the stored position, as seen clearly in FIGURES 8 and 9, the finger portions 48 bear against the solid member 56 at the upper end of the leg holding it against the rear wall 20 of the corner member. As the leg is pulled down against action of the counter-balancing springs 66, the flanges 46 guide the upper end towards the front open side of the corner member through which the leg is withdrawn. As the leg is pulled down the ends 60 of the solid member 56 of the leg ride loosely in the curved flanges 38 at the open side of the corner member until the ends rest on the ledges 52 of the flanges 50 which also aid in guiding the leg to this position. The leg is then moved toward the corner member and after the plunger rod 172 moves outwardly and the locking pin 152 enters the aperture 44 in the corner member, the leg is raised whereupon the crescent member 170 enters the aperture 44 and completes the locking action. By means of the wrench handle 126, the screw 86 is turned to lower the lower leg section 78 until the foot pad 114 engages the ground. Then the pin 148 is removed from the bracket 150 on the leg and the brace 130 is turned until its trunnion 142 is made to engage in socket member 144 and there attached by the pin 148. Further vertical adjustment of landing gear can be made by again operating the wrench handle.

To store the landing gear, the foot pad is raised by the jack screw, the brace is detached from the socket member 144, the plunger rod 172 and crescent member 170 are withdrawn and the leg lowered slightly to permit the locking pin to leave the aperture 44 in the corner member. Then the wrench handle is pushed against the leg, the brace is pushed against the leg and there reattached, the foot pad 114 pivoted upwardly and the counter-balancing springs 66 allowed to raise the leg upwardly as it is pushed into the corner member through its side opening. In this motion, the plate 188 was retained in its vertical position shown in phantom lines in FIGURE 14. When the leg is totally in the corner member, the plate 188 is then turned 90° to a transverse position where its ends are positioned behind the flanges 38 of the corner member to hold the leg in its stored position.

While a preferred embodiment of the invention has been here shown and described, a skilled artisan may make minor variations without departing from the spirit of the invention and the scope of the appended claims.

I claim:

1. In combination with a container having at least one vertically extending member opening over its major length through the side thereof, a landing gear comprising a vertically extending leg, counter-balancing means connecting said leg to said member urging said leg vertically upwardly and through said side opening, the full length of said leg being capable of confinement in said member in its retracted inoperative position, means removably retaining said leg in said member in said retracted inoperative position and means releasably attaching an intermediate portion of said leg to said member beneath said side opening when the said major portion of said leg is withdrawn from said member through said side opening and is in an operative load supporting position.

2. The combination of claim 1 and a ground-engaging foot pivoted to the lower end of said leg, said foot being movable to a position whereby it can be confined with said leg as a unit in said member in the inoperative or storage position of the leg.

3. The combination of claim 1 and an elongated brace pivoted at one of its ends to said leg, means to releasably attach the other end of said brace to said container when said leg is in its operative load supporting position and means to releasably attach said other end of said brace to said leg whereby said leg and brace can be confined as a unit in said member in the inoperative or storage position of said leg.

4. The combination of claim 1 and means to continually adjust the height of said leg.

5. The combination of claim 4 wherein said leg comprises upper, intermediate and lower sections, the lower section carrying a ground-engaging pad and being telescoped within said intermediate section, said means to continually adjust the height of said leg including a nut keyed in said lower section and a jack screw extending through and rotatably mounted in said intermediate section and received in said nut, the upper end of said jack screw being exposed and adapted for engagement by an operating wrench adjacent the lower end of said vertically extending member.

6. The combination of claim 5 and a ratchet wrench mounted on the upper end of said jack screw and a handle pivoted to said wrench for movement from a position transverse said leg for operation of said jack screw to a position against said leg for confinement therewith in said vertically extending member in the storage position.

7. The combination of claim 1 wherein said vertically extending member includes flanges at said side opening and said means removably retaining said leg in said member in its retracted position includes an elongated latch bar mounted on said leg for vertically slidable and rotatable movement from a non-latching position in which said bar extends vertically of said leg to a latching position in which said bar traverses said leg and the end portions of said bar engage behind said flanges when said leg is confined within said member in the storage position.

8. The combination of claim 1 wherein said counterbalancing means comprises a spool rotatably mounted in said vertically extending member adjacent its upper end and a constant retraction force torsion spring wound on said spool and attached to said leg adjacent the upper end of the latter.

9. The combination of claim 1 wherein said counterbalancing means interconnects an upper end portion of said leg and an upper end portion of said vertically extending member and means guiding the vertical movement of said upper end portion of said leg in said member.

10. The combination of claim 1 wherein said means releasably attaching an intermediate portion of said leg to said member beneath said side opening includes a transverse bore in said intermediate portion, a locking pin slidably mounted in said bore, said member including a wall beneath said side opening with an aperture provided therein to receive said locking pin, said locking pin including a flange portion releasably engageable with a portion of said wall about said aperture to effect the locking operation.

11. The combination of claim 10, spring means urging said pin towards said wall, the diameter of said pin including said flange portion approximating that of said aperture, a portion cut out of the outer surface of said pin behind said flange portion and a spring-urged manually retractable plunger mounted in said transverse bore, said plunger carrying a filler member complementary to said cut-out portion slidably beneath said pin and diametrically opposite said cut-out portion whereby when said leg is moved towards said member, said plunger and filler member strike said wall about said aperture and are retracted sufficiently to allow said pin to pass through said aperture until said leg can be raised to the point where said flange portions bears against said wall and said filler member is urged through said aperture beneath said pin to complete the locking operation.

12. The combination of claim 11 and a further flange in said bore complementary to and above said cut-out portion whereby said pin is retracted, in the unlatching operation until said flange portion is with said bore, said filler member will pass beneath said pin and raise and hold it in the position where its flange portion engages said further flange.

13. The combination of claim 12 wherein said pin includes a second flange portion similar to said first-named flange portion, said second flange portion being disposed in said bore and engaging said further flange therein in the latched position when said first-named flange portion bears against said wall to restrain further movement of said pin into said member.

References Cited in the file of this patent

UNITED STATES PATENTS 2,990,194     Abolins                 June 27, 1961